United States Patent [19]

Kimura

[11] Patent Number: 4,540,502

[45] Date of Patent: Sep. 10, 1985

[54] HEAT STORAGE MATERIAL

[75] Inventor: Hiroshi Kimura, Sakai, Japan

[73] Assignee: Mitsubishi Denki Kabushiki Kaisha, Tokyo, Japan

[21] Appl. No.: 544,640

[22] Filed: Oct. 24, 1983

[30] Foreign Application Priority Data

Dec. 15, 1982 [JP] Japan ................................ 57-222272
Dec. 15, 1982 [JP] Japan ................................ 57-222273
Jun. 21, 1983 [JP] Japan ................................ 58-113065

[51] Int. Cl.$^3$ .............................................. C09K 5/06
[52] U.S. Cl. ..................................... 252/70; 126/400; 165/DIG. 4
[58] Field of Search ........................................ 252/70

[56] References Cited

U.S. PATENT DOCUMENTS 4,430,241  2/1984  Fiorucci ................................ 252/70

FOREIGN PATENT DOCUMENTS 55-32749   8/1980  Japan ...................................... 252/70
55-142080  11/1980 Japan ...................................... 252/70
57-139168  8/1982  Japan ...................................... 252/70
58-183786  10/1983 Japan ...................................... 252/70

OTHER PUBLICATIONS

Lane et al., "Macro-Encapsulation of Heat Storage Phase-Change Material for Use in Residential Buildings", Report, 1978, ORO-5217-8 (CA 93: 50515).
Lane, "Low Temperature Heat Storage with Phase Change Materials", Int. J. Ambient Energy, 1981, 1 (3), 155-168 (CA 95: 65224).

Primary Examiner—Paul Lieberman
Assistant Examiner—Robert A. Wax
Attorney, Agent, or Firm—Oblon, Fisher, Spivak, McClelland & Maier

[57] ABSTRACT

A heat storage material which comprises $CaCl_2.6H_2O$, as a main component, containing at least one anhydride selected from the group consisting of an anhydrous bromide and an anhydrous nitrate.

12 Claims, No Drawings

HEAT STORAGE MATERIAL

The present invention relates to a heat storage material which utilizes a latent heat of fusion at a temperature of about 20° C. The heat storage material is useful for a heating system such as an agricultural vinyl house designed to utilize a solar energy.

A heat storage material is a substance whereby a latent heat of fusion or solidificaiton in its phase change is utilized for storing or radiating heat. Such a heat storage material is useful for an air-conditioning, a waste heat recovery or a solar heat storage.

$CaCl_2.6H_2O$ is considered to be a promising heat storage material, since it has a phase change temperature of 29° C. and a latent heat of fusion of 41 cal/g and is inexpensive. Further, the present inventors have earlier proposed a technique to prevent crystallization of $CaCl_2.4H_2O$ (the melting point of the $\alpha$-phase: 45° C.) which is likely to take place during repeated phase changes of $CaCl_2.6H_2O$. (For instance, see Japanese Unexamined Patent Publication No. 38879/1982, Japanese Unexamined Patent Publication No. 95597/1982 which corresponds to U.S. application Ser. No. 295147 and Japanese Unexamined Patent Publication No. 185377/1982 which corresponds to U.S. application Ser. No. 332172.)

However, $CaCl_2.6H_2O$ has a melting point of 29° C., which is slightly too high for the utilization of a solar energy, particularly when the solar energy is to be utilized in a vinyl house during winter time so that the energy stored during the daytime is to be radiated during the night time. Thus, $CaCl_2.6H_2O$ is not adequately practically useful for such a purpose. The optimum phase change temperature for such a purpose is considered to be from 20° to 25° C.

On the other hand, the present inventors have proposed to mix $CaCl_2.6H_2O$ with a proper amount of an appropriate hydrate to lower the melting point to about 20° C. (Japanese Unexamined Patent Publications Nos. 43387/1976, 76183/1976 and 128052/1976). For instance, it is known that a practically useful heat storage material having a melting point of about 20° C. can be obtained by adding to $CaCl_2.6H_2O$ about 20 molar % of e.g. $MgBr_2.6H_2O$ or $CaBr_2.6H_2O$. However, such a mixture is costly, since it is necessary to use a relatively large amount of a hydrate of calcium bromide or magnesium bromide. Thus, the mixture has a substantial economical disadvantage that its cost is as high as 5 to 10 times the cost of a heat storage material made of $CaCl_2.6H_2O$ alone.

Accordingly, it is an object of the present invention to overcome the above-mentioned disadvantage of the conventional heat storage materials, and to provide a practically useful heat storage material having a melting point of about 20° C.

It has been found that the above object can be attained by adding to $CaCl_2.6H_2O$ at least one anhydride selected from the group consisting of an anhydrous bromide (such as KBr or $NH_4Br$) and an anhydrous nitrate (such as $KNO_3$ or $NH_4NO_3$).

Thus, the present invention provides a heat storage material which comprises $CaCl_2.6H_2O$, as a main component, containing at least one anhydride selected from the group consisting of an anhydrous bromide and an anhydrous nitrate.

Now, the present invention will be described in detail with reference to the preferred embodiments.

Firstly, the addition of the anhydrous bromide will be described. Table 1 shows the melting points and the heat of fusion of samples in which KBr or $NH_4Br$ is incorporated. Further, for the purpose of comparison, similar data are given with respect to samples in which a chloride, i.e. KCl or $NH_4Cl$, is incorporated.

TABLE 1

Melting points and heat of fusion of samples (when an anhydrous bromide is added)

| No. | Additives | Concentration (% by weight) | Melting point (°C.) | Heat of fusion (cal/g) | State at 30° C. |
|---|---|---|---|---|---|
| 1 | KCl | 5 | 28 | 39.5 | Uniform liquid phase |
| 2 | KCl | 10 | 27 | 40.7 | KCl slightly precipitated |
| 3 | KBr | 5 | 25 | 38.8 | Unifrom liquid phase |
| 4 | KBr | 10 | 24 | 38.6 | KBr slightly precipitated |
| 5 | $NH_4Cl$ | 2 | 24 | 40.7 | Uniform liquid phase |
| 6 | $NH_4Cl$ | 5 | 26 | 43.5 | $NH_4Cl$ precipitated |
| 7 | $NH_4Cl$ | 8.3 | 25 | 37.3 | $NH_4Cl$ precipitated |
| 8 | $NH_4Br$ | 2 | 27 | 41.4 | Uniform liquid phase |
| 9 | $NH_4Br$ | 5 | 23 | 36.4 | Uniform liquid phase |
| 10 | $NH_4Br$ | 10 | 22 | 35.0 | $NH_4Br$ slightly precipitated |

It is evident from Table 1 that KCl and $NH_4Cl$ are inferior in their ability to lower the melting point, and they are not suitable as the additive. Whereas, KBr and $NH_4Br$ are found to provide desirable effects.

The saturation point in the solubility of these additives is at a concentration slightly lower than 10% by weight, since a small amount remains undissolved at the concentration of 10% by weight. The amounts of addition of KBr and $NH_4Br$ are practically at most 10% by weight, preferably about 5% by weight, when they are added alone, respectively.

Now, the addition of an anhydrous nitrate will be described. Table 2 shows the melting points and the heat of fusion of samples in which two nitrates, i.e. $KNO_3$ and $NH_4NO_3$, are added alone or in combination with their bromides, i.e. KBr and $NH_4Br$, respectively.

TABLE 2

Melting points and heat of fusion of samples (when an anhydrous nitrate is added)

| No. | Additives | Concentration (% by weight) | Melting point (°C.) | Heat of fusion (cal/g) | State at 30° C. |
|---|---|---|---|---|---|
| 11 | $KNO_3$ | 5 | 21 | 32.7 | Uniform liquid phase |
| 12 | $KNO_3$ | 10 | 17 | 24.3 | $KNO_3$ slightly precipitated |
| 13 | $KNO_3$:KBr | 2:2 | 23 | 35.0 | Uniform liquid phase |
| 14 | $NH_4NO_3$ | 2 | 22 | 33.0 | Uniform liquid phase |

TABLE 2-continued

Melting points and heat of fusion of samples (when an anhydrous nitrate is added)

| No. | Additives | Concentration (% by weight) | Melting point (°C.) | Heat of fusion (cal/g) | State at 30° C. |
|---|---|---|---|---|---|
| 15 | $NH_4NO_3$ | 5 | 15 | 24.0 | Uniform liquid phase |
| 16 | $NH_4NO_3$ | 10 | 8 | 18.5 | $NH_4NO_3$ slightly precipitated |
| 17 | $NH_4NO_3:NH_4Br$ | 1:5 | 21 | 34.5 | Uniform liquid phase |
| 18 | $NH_4NO_3:NH_4Br$ | 2:5 | 21 | 32.3 | Uniform liquid phase |
| 19 | $NH_4NO_3:NH_4Br$ | 2:2 | 20 | 36.9 | Uniform liquid phase |

It is evident from Table 2 that both $KNO_3$ and $NH_4NO_3$, like the above-mentioned bromides, exhibit desirable effects. However, when compared with the case where the bromides are added, not only the decrease of the melting point is slightly greater, but also the decrease of the heat of fusion is correspondingly greater. Accordingly, the practical amounts of addition are rather limited as compared with the case of anhydrous bromides. From Table 2, it is seen that both $KNO_3$ and $NH_4NO_3$ have a saturation point in their solubility at a concentration of about 10% by weight. Thus, the practical amount of addition is at most 10% by weight, but it is preferably from 2 to 3% by weight.

Further, from the experimental results in Table 2 with respect to Samples No. 13 and Nos. 17 to 19, it is evident that when these bromides and nitrates are added in combination, the stability in the phase change is further improved over the case where they are added independently. For instance, when $NH_4NO_3$ and $NH_4Br$ are added each in an amount of 2% by weight, Sample No. 19 has a melting point of about 20° C. and a heat of fusion of about 37 cal/g, thus indicating that the decrease of the heat of fusion is not so great as compared with the substantial decrease of the melting point. This composition is also advantageous from the economical point of view, since the amounts of the additives may be small. Besides, the cost of $NH_4NO_3$ is substantially lower than the cost of $NH_4Br$. Thus, this composition is substantially less costly, for instance, as compared with the case where $NH_4Br$ is added in an amount of 5% by weight. Similar advantageous effects are obtainable also in the case where $KNO_3$ and $KBr$ are added each in an amount of 2% by weight (Sample No. 13 in Table 2). With respect to the case where the anhydrous nitrate and the anhydrous bromide are added in combination, the upper and lower limits of the total amount will be mentioned. Firstly, the upper limit of the amount of the addition of the anhydrous nitrate is determined on the basis of its solubility (i.e. at most 10% by weight) and the allowability of the decrease in the heat of fusion. However, the upper limit is usually determined primarily based on the latter factor. For instance, if the allowability of the decrease in the heat of fusion is set to be about 10 cal/g, the upper limit for $KNO_3$ is about 5% by weight and the upper limit for $NH_4NO_3$ is about 2% by weight (see Table 2). Likewise, the upper limit of the amount of addition of the anhydrous bromide itself is determined on the basis of its solubility (i.e. at most 10% by weight) and the degree of the decrease in the melting point. However, the upper limit is usually determined primarily based on the degree of the decrease in the melting point. For instance, as shown in Table 1, the upper limit for $KBr$ is about 5% by weight and the upper limit for $NH_4Br$ is likewise about 5% by weight.

Accordingly, when the anhydrous nitrate and the anhydrous bromide are added in combination, it may be said that the practical upper limit of the total amount is, for instance, 10% by weight in the case of a combination of $KNO_3$ and $KBr$, or 7% by weight in the case of a combination of $NH_4NO_3$ and $NH_4Br$. The lower limit of the total amount of these additives should be determined depending upon the desired degree of the decrease in the melting point of the composition, and should eventually be evaluated also from the viewpoint of the costs which constitute the most important factor for the evaluation. Accordingly, it may be said that the upper limit of the total amount of the additives is 10% by weight and the lower limit is about 2% by weight. However, from the practical point of view, a total amount of about 5% by weight is most preferred.

Nitrates and bromides other than those mentioned above, for instance $NaNO_3$ and $NaBr$, do not have a solubility as high as the solubility of the potassium salt or the ammonium salt, and accordingly they do not have equal effectiveness. $LiNO_3$ and $LiBr$ are superior in their effectiveness to the corresponding sodium salts, but from the economical point of view, they can not be regarded as practical additives, since they are very expensive.

Further, potassium salts or ammonium salts other than those of the nitrates or bromides mentioned here, for instance sulfates, acetates, carbonates, hydrocarbonates, phosphates or fluorides, are not practically useful as the additives, since they react with $CaCl_2.6H_2O$ to readily form insoluble calcium salts.

As described in the foregoing, according to the present invention, at least one anhydride selected from the group consisting of an anhydrous nitrate (such as $KNO_3$ or $NH_4NO_3$) and an anhydrous bromide (such as $KBr$ or $NH_4Br$) is added to $CaCl_2.6H_2O$, whereby the melting point of $CaCl_2.6H_2O$ can be lowered. The compositions thereby obtained have superior phase change stability and has a feature that the overall cost of the additives is low. These compositions will be described in detail in Examples 1 to 6 given hereinafter.

The above-mentioned compositions are per se useful as heat storage materials which can be practically used for an extended period of time. However, they have more or less a disadvantage that they tend to have a concentration gradient. It has been found that when at least one hydrate selected from the group consisting of a chloride, a bromide and a nitrate is further added in a small amount to the above-mentioned compositions, the formation of the concentration gradient and the super cooling can be prevented and heat storage materials having improved solidification characteristics and phase change stability can be obtained.

Namely, among the above-mentioned compositions, $CaCl_2.6H_2O$ containing two anhydrides i.e. $KNO_3$ and $KBr$, or $NH_4NO_3$ and $NH_4Br$, in an amount of 5% by weight each, is useful as the composition of the invention described below. When at most 10% by weight of at least one hydrate selected from the group consisting of e.g. $Ca(NO_3)_2.4H_2O$, $CaBr_2.6H_2O$, $Mg(NO_3)_2.6H_2O$, $MgCl_2.6H_2O$ and $MgBr_2.6H_2O$ is added to such a composition, the concentration gradient in the vertical direction (i.e. the direction of the gravity) in the liquid is substantially eliminated, and it is thereby possible to obtain a heat storage material which is free from crystallization of undesirable $CaCl_2.4H_2O$. The amount of addition of the above-mentioned hydrate may be determined taking the costs into account, and a combination suitable for a practical purpose may be selected within a range of the total amount of at most 10% by weight, preferably at most 5% by weight. The primary purpose for the addition of these hydrates is to prevent the formation of the concentration gradient. Accordingly, it is practically most important to obtain the maximum effect with the minimum cost (the minimum amount of the addition). If these hydrates are added excessively, it is likely that the melting point is further lowered to a level which is outside the desirable range of the melting point. For instance, the hydrate of a nitrate has greater effectiveness to reduce the melting point as compared with the hydrate of a halide, and when 10% by weight of the hydrate of a nitrate is added to $CaCl_2.6H_2O$, the melting point will be lowered to a level of about 20° C. When the same amount of the hydrate of a nitrate is added to the above-mentioned composition, the melting point will be lowered to a level of about 10° C., which is too low for practical purposes. In the case of the hydrate of a halide, the decrease of the melting point is not so great. However, in the case of the halide of a bromide, the decrease of the melting point is fairly great, and its cost is rather high. Therefore, the upper limit is about 10% by weight. As shown in Table 3, the lower limit is 1% by weight in the case of the halide of a nitrate, and may be slightly higher (from 1 to 3% by weight) in the case of the hydrate of a halide. Thus, a total amount of the addition for the practical purpose is about 5% by weight. Further, like in the case of the above-mentioned anhydrides, it is advatageous also in the case of hydrates to combine e.g. the hydrate of a nitrate and the hydrate of a halide in that it is thereby possible to obtain a great effect with small amounts of addition.

If the composition of $CaCl_2.6H_2O$ containing 2% by weight of each of $NH_4NO_3$ and $NH_4Br$ is represented by molar %, it comprises 90.2 molar % of $CaCl_2.6H_2O$, 5.4 molar % of $NH_4NO_3$ and 4.4 molar % of $NH_4Br$, whereby the total amount of the $NH_4NO_3$ and $NH_4Br$ is as high as about 10 molar %. Likewise, the composition containing 2% by weight of each of $KNO_3$ and $KBr$, comprises 92 molar % of $CaCl_2.6H_2O$, 4.3 molar % of $KNO_3$ and 3.7 molar % of $KBr$.

Now, the present invention will be described in further detail with reference to Examples 7 to 13. However, it should be understood that the present invention is by no means restricted by these specific examples.

EXAMPLE 1

A composition of $CaCl_2.6.11H_2O$ mixed with 5% by weight of KBr was packed in a high density polyethylene tube having an inner diameter of 40 mm and a length of 1000 mm, and at the same time, 0.01% by weight of $BaZrO_3$ was added as a nucleating agent. The mixture started to solidify when cooled to 18° C., remained at 21° C. during the solidification and formed a uniform liquid phase at 30° C., and thus repeated the steady and constant phase change.

EXAMPLE 2

A composition of $CaCl_2.6.11H_2O$ mixed with 5% by weight of $NH_4Br$ was packed in a high density polyethylene tube having an inner diameter of 40 mm and a length of 1000 mm, and at the same time, 0.01% by weight of $BaZrO_3$ was added as a nucleating agent. The mixture started to solidify when cooled to 18° C., remained at 21.5° C. during the solidification and formed a uniform liquid phase at 30° C., and thus repeated the steady and constant phase change.

EXAMPLE 3

A composition of $CaCl_2.6.08H_2O$ mixed with 4% by weight of $KNO_3$ was packed in the same high density polyethylene tube as in Example 1, and 0.05% by weight of $BaTiO_3$ was added as a nucleating agent. The mixture started to solidify when cooled to 18° C., and formed a uniform liquid phase at 30° C., and thus repeated the steady and constant phase change.

EXAMPLE 4

A composition of $CaCl_2.6.08H_2O$ mixed with 2% by weight of $NH_4NO_3$ was packed in the same high density polyethylene tube as in Example 1, and 0.05% by weight of $BaTiO_3$ was added as a nucleating agent. The mixture started to solidify when cooled to 20° C., and formed a uniform liquid phase at 30° C., and thus repeated the steady and constant phase change.

EXAMPLE 5

A composition of $CaCl_2.6.11H_2O$ mixed with 2% by weight of $KNO_3$, 2% by weight of KBr and 0.5% by weight of NaCl was packed in the same high density polyethylene tube as in Example 1, and at the same time, 0.01% by weight of $BaZrO_3$ was added as a nucleating agent. The mixture sealed in the tube started to solidify when cooled to 20° C., maintained the heat generating temperature of 23° C. during the solidification and formed a uniform liquid phase at 30° C., and thus repeated the steady and constant phase change.

EXAMPLE 6

A composition of $CaCl_2.6.11H_2O$ mixed with 2% by weight of $NH_4NO_3$, 2% by weight of $NH_4Br$ and 0.5% by weight of NaCl was packed in the same high density polyethylene tube as in Example 1, and at the same time, 0.01% by weight of $BaZrO_3$ was added as a nucleating agent. The mixture sealed in the tube started to solidify when cooled to 15° C., maintained the heat generating temperature of 20° C. during the solidification and formed a uniform liquid phase at 26° C., and thus repeated the steady and constant phase change.

EXAMPLE 7

To $CaCl_2.6.1H_2O$ (in which at least 0.2% by weight of NaCl was dissolved), 2% by weight of $NH_4NO_3$ and 2% by weight of $NH_4Br$ were added, and 1% by weight of $Ca(NO_3)_2.4H_2O$ was further added. The mixture was fused to obtain a uniform solution. After adding 0.1% by weight of $BaZrO_3$ as a nucleating agent, the solution was subjected to a heat cycle test at 30° to 12° C. For the heat cycle test, a sample was placed in a vertical glass tube having an inner diameter of 20 mm (the height of the liquid: about 900 mm), and by means of five thermocouples (placed in a distance of 150 mm), the temperature changes at the respective portions were recorded. As a result, it was found that the steady and constant phase change was repeated for 1200 times or more, and no phase separation of $CaCl_2.4H_2O$ was observed. The temperature characteristics at the time of the solidification were as shown in Table 3.

EXAMPLE 8

A composition prepared in the same manner as in Example 7 except that instead of $Ca(NO_3)_2.4H_2O$, the same amount of $Mg(NO_3)_2.6H_2O$ was added, was subjected to the same test as in Example 7, whereby the steady and constant phase change was repeated for 1200 times or more and no crystallization of $CaCl_2.4H_2O$ was observed. The temperature characteristics at the time of the solidification were as shown in Table 3.

EXAMPLE 9

To $CaCl_2.6.0H_2O$, 2% by weight of $KNO_3$ and 2% by weight of $KBr$ were added, and 1% by weight of $Ca(NO_3)_2.4H_2O$ was further added. The mixture was fused to obtain a uniform solution. After adding 0.1% by weight of $BaTiO_3$ as a nucleating agent, the solution was subjected to the same heat cycle test as in Example 7, whereby the steady and constant phase change was repeated for 1200 times or more. The temperature characteristics at the time of the solidification were as shown in Table 3.

EXAMPLE 10

A composition prepared in the same manner as in Example 9 except that instead of $Ca(NO_3)_2.4H_2O$, the same amount of $Mg(NO_3)2.6H_2O$ was added, was subjected to the same heat cycle test as in Example 7, whereby the steady and constant phase change was repeated for 1200 times or more, and no crystallization of $CaCl_2.4H_2O$ was observed. The solidification characteristics were as shown in Table 3.

EXAMPLE 11

A composition prepared in the same manner as in Example 7 except that instead of $Ca(NO_3)_2.4H_2O$, 2% by weight of $CaBr_2.6H_2O$ was added, was subjected to the same test as in Example 7, whereby the steady and constant phase change was repeated for 1200 times or more. The freezing point was 20° C.

EXAMPLE 12

A composition prepared in the same manner as in Example 9 except that instead of $Ca(NO_3)_2.4H_2O$, 2% by weight of $MgBr_2.6H_2O$ was added, was subjected to the same test as in Example 7, whereby the steady and constant phase change was repeated for 1200 times or more. The freezing point was 20° C.

EXAMPLE 13

A composition prepared in the same manner as in Example 7 except that instead of $Ca(NO_3)_2.4H_2O$, 1% by weight of $MgCl_2.6H_2O$ was added, had a freezing point of 21° C., and when subjected to the same test as in Example 7, repeated the steady and constant phase change for 1200 time or more.

Table 3 shows the temperature changes of the compositions at the time of the solidification, wherein Comparative Examples 1 and 2 represent compositions (No. 19 and No. 13) containing anhydrides without containing the fourth additive, and Examples 7 to 10 represent the above-mentioned typical compositions. In the Table, "First" and "Last" represent the temperatures of the portions which solidify first and last, respectively. In both the "First" and "Last", the first mentioned value indicates the temperature at the initiation of the solidification (i.e. the temperature at which the supercooled state was broken) and the last mentioned value indicates the heat generation temperature (i.e. the freezing point) during the solidification.

The differences of 3.5° C. and 3.7° C. in the freezing points of the "First" and "Last" as observed in the respective Comparative Examples where no hydrates were added, were not observed immediately after the respective samples were uniformly mixed, and such differences appeared as the phase change was repeated. Accordingly, it is considered that a concentration gradient in the vertical direction was formed in the solution during the repeated phase change. In fact, the average values of the freezing points of the "First" and "Last" substantially correspond to the melting points of the respective samples. The term "concentration gradient" is used in this sense. However, when 1% by weight of $Ca(NO_3)_2.4H_2O$ or $Mg(NO_3)_2.6H_2O$ is added to such a composition, the freezing points of the "First" and "Last" agree to each other with the difference being within 1° C., and at the same time, the temperature at the initiation of the solidification of the "Last" increases by a few °C., thus indicating that the supercooling is improved so that the solidification is facilitated. It is considered that in a $CaCl_2.6H_2O$-anhydride system, the interaction between $CaCl_2.6H_2O$ as the main component and the anhydride as the additive is somehow poor, whereas when a small amount of a hydrate is added, the hydrate somehow serves as an intermediary for the main component and the additive. Namely, it may be said that the effect of the hydrate as the fourth additive is not only to prevent the formation of the concentration gradient but also to improve the solidification characteristics.

TABLE 3

| Temperature changes at the time of solidification | | | | | |
|---|---|---|---|---|---|
| Comparative Example 1 (No. 19) $NH_4NO_3$—$NH_4Br$ 2% by weight each | | Example 7 $Ca(NO_3)_2.4H_2O$ 0.1% by weight | | Example 8 $Mg(NO_3)_2.6H_2O$ 0.1% by weight | |
| First (°C.) | Last (°C.) | First (°C.) | Last (°C.) | First (°C.) | Last (°C.) |
| 18.6; 20.0 | 14.5; 23.5 | 19.5; 20.5 | 16.9; 19.8 | 19.5; 20.7 | 17.6; 21.0 |
| Comparative Example 2 (No. 13) $KNO_3$—$KBr$ 2% by weight each | | Example 9 $Ca(NO_3)_2.4H_2O$ 0.1% by weight | | Example 10 $Mg(NO_3)_2.6H_2O$ 0.1% by weight | |
| First (°C.) | Last (°C.) | First (°C.) | Last (°C.) | First (°C.) | Last (°C.) |
| 20.2; 20.5 | 15.1; 23.2 | 19.8; 20.7 | 17.5; 20.2 | 19.7; 20.5 | 18.0; 20.2 |

Further, when a small amount of the hydrate is added, no substantial decrease in the heat of fusion is observed, and the decrease is not greater than 2 cal/g especially when a hydrate of a halide is added, the heat of fusion may be calculated by summing up the products obtained by multiplying the contents of the respective components by the respective heat of fusion in accordance with the approximation of an ideal solution.

The Examples given above illustrate the cases wherein the hydrates are added individually. However, when two or more different hydrates are added in combination, particularly in the case of the combination of the hydrate of nitrate with the hydrate of a halide, a further improved effect is obtainable by the synergistic effects of the plurality of hydrates.

As described in the foregoing, it is possible not only to prevent the formation of the concentration gradient and the supercooling but also to obtain a heat storage material having improved solidification characteristics and phase change stability by using $CaCl_2.6H_2O$ which contains (a) an anhydrous bromide, (b) an anhydrous nitrate and (c) at least one hydrate selected from the group consisting of hydrates of a chloride, a bromide and a nitrate. Further, by the addition of the hydrate, it is possible to control the melting point of the heat storage material within a range of a few °C. to obtain a composition suitable for the particular purpose.

I claim:

1. A heat storage material which comprises $CaCl_2.6H_2O$, as a main component, an amount effective to decrease the melting point thereof of at least one anhydrous component selected from the group consisting of $NH_4Br$ and $KNO_3$ and mixtures thereof with at least one of $KBr$ and $NH_4NO_3$, and up to an amount not exceeding the saturation point of the anhydrous $NH_4Br$ or $KNO_3$ in the liquefied heat storage material at 30° C. and not exceeding a concentration of 10 percent by weight, and 0 to 10% of at least one hydrate selected from the group consisting of a hydrate of a chloride other than of calcium, a bromide and a nitrate.

2. The storage material according to claim 1, wherein the anhydrous component includes $NH_4Br$.

3. The heat storage material according to claim 1, wherein the anhydrous component includes $KNO_3$.

4. The heat storage material according to claim 2, wherein the anhydrous component includes $NH_4NO_3$ or $KNO_3$.

5. A heat storage material which comprises $CaCl_2.6H_2O$, as a main component, containing (a) an anhydrous bromide, (b) an anhydrous nitrate and (c) at least one hydrate selected from the group consisting of a hydrate of a chloride of other than calcium, a bromide and a nitrate, the total of (a) and (b) being an amount effective to decrease the melting point of $CaCl_2.6H_2O$ and up to an amount not exceeding the saturation point of the same in the liquefied heat storage material at 30° C. and not exceeding a concentration of up to 10% by weight, and the amount (c) being effective to diminish supercooling but not more than 10% by weight of the composition.

6. The heat storage material according to claim 5, wherein the anhydrous bromide is $NH_4Br$ or $KBr$.

7. The heat storage material according to claim 5, wherein the anhydrous nitrate is $NH_4NO_3$ or $KNO_3$.

8. The heat storage material according to claim 5, wherein the hydrate of a chloride is $MgCl_2.6H_2O$.

9. The heat storage material according to claim 5, wherein the hydrate of a bromide is at least one hydrate selected from the group consisting of $CaBr_2.6H_2O$ and $MgBr_2.6H_2O$.

10. The heat storage material according to claim 5, wherein the hydrate of a nitrate is at least one hydrate selected from the group consisting of $Ca(NO_3)_2.4H_2O$ and $Mg(NO_3)_2.6H_2O$.

11. The heat storage material according to claim 3 wherein the anhydrous component includes $KBr$.

12. The heat storage material according to claim 1 which includes a nucleating amount of a nucleating agent.

* * * * *